United States Patent [19]

Kordomenos et al.

[11] Patent Number: 4,486,556
[45] Date of Patent: Dec. 4, 1984

[54] THERMOSETTING COATING COMPOSITION-III

[75] Inventors: Panagiotis I. Kordomenos, Mt. Clemens; Kenneth R. Kurple, Anchorville, both of Mich.

[73] Assignee: Ford Motor Company, Dearborn, Mich.

[21] Appl. No.: 431,509

[22] Filed: Sep. 30, 1982

[51] Int. Cl.$^3$ ............... C08G 59/14; C08L 63/10; C08L 75/06
[52] U.S. Cl. .................... 523/400; 525/528; 528/45; 528/73
[58] Field of Search ............ 525/528; 528/45, 73; 523/400

[56] References Cited

U.S. PATENT DOCUMENTS

| | | | |
|---|---|---|---|
| 3,215,757 | 11/1965 | Scheibli et al. | 525/514 |
| 3,951,891 | 4/1976 | Töpfl et al. | 525/514 |
| 4,346,144 | 8/1982 | Craven | 525/124 |
| 4,355,058 | 10/1982 | Gras et al. | 525/528 |

FOREIGN PATENT DOCUMENTS

| | | | |
|---|---|---|---|
| 36523 | 5/1975 | Japan | 525/528 |
| 72728 | 6/1977 | Japan | 525/528 |

OTHER PUBLICATIONS

Lee & Neville, Handbook of Epoxy Resins, McGraw-Hill Book Co., New York, N.Y., 1967, pp. 11-13 to 11-15, 11-17 to 11-19 & 17-21.

*Primary Examiner*—Allan M. Lieberman
*Assistant Examiner*—Robert E. L. Sellers
*Attorney, Agent, or Firm*—Roger L. May; Keith L. Zerschling

[57] ABSTRACT

Novel solvent based, thermosetting coating compositions comprising epoxy ester resin and blocked polyisocyanate crosslinking agent. The epoxy ester resin used in the composition has a number average molecular weight ($M_n$) of about 900 to about 5000 and is the reaction product of diepoxide, for example bisphenol-A epichlorohydrin epoxy resin, with (i) diphenol, for example bisphenol A, in chain extension reaction, (ii) dicarboxylic acid, for example the dimer acid reaction product of the dimerization of C-18 fatty acid, in chain extension reaction and (iii) fatty acid, for example Soya fatty acid, in chain terminating esterification reaction, which chain extension reaction and esterification reaction occur at least in part substantially simultaneously and at a temperature reaching at least about 135° C. (275° F.). The blocked polyisocyanate crosslinking agent comprises at least one isocyanato group which has been blocked by reaction with an active hydrogen bearing blocking agent and is included in an amount sufficient to provide about 0.5 to about 1.6 reactive isocyanato groups per reactive group on the epoxy ester resin upon deblocking during cure.

47 Claims, No Drawings

THERMOSETTING COATING COMPOSITION-III

TECHNICAL FIELD

This invention relates to a novel epoxy ester resin and to a novel, solvent-based, thermosetting coating composition comprising same. It relates also to such coating composition formulated, for example, as sprayable, high solids coating composition suitable for use as an automotive vehicle primer to make coatings which are highly resistant to corrosion, humidity and solvents.

BACKGROUND ART

Solvent-based coating compositions are known which employ high molecular weight (e.g. 5,000 to 40,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 623 g/l (5.2 lb./gal).

Elimination of the volatile organic solvent portion during curing of these conventional low-solids coating compositions is relatively large and therefore presents undesirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, in the United States, governmental guidelines establish certain deadlines by which time emissions of volatile organics from automotive vehicle primer coating operations must be reduced to within certain defined limits. To meet such guidelines, coating compositions of reduced VOC can be employed in conjunction with emissions treatment equipment to achieve the specified emissions limit. Such treatment presents significant additional expense, however, and thus there is a great need for coating compositions of VOC reduced near to, or preferably even lower than, the governmental limits, which yet can be applied to a substrate using known spray application techniques.

In response to these concerns, high solids coating compositions have been suggested which, typically, employ a low molecular weight multi-functional adduct or copolymer in combination with a multi-functional crosslinking agent. These high solids coating compositions can be applied by spraying, for example, with lower VOC than would be possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote crosslinking and in some instances polymerization of the multi-functional low molecular weight component(s).

Typically, the physical properties of the coatings provided by such known high solids coating compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrates.

Still further many high solids coating compositions, in particular prior art epoxy ester amino resin primers, exhibit poor package stability, especially in the presence of corrosion inhibiting pigments such as zinc chromate. Accordingly, it would be highly desirable to provide a coating composition comprising low molecular weight materials suitable for use in high solids, solvent based coating compositions and yet which, not only exhibits good package or shelf stability even in the presence of corrosion inhibiting pigments, but also, upon curing, form coatings having physical properties comparable to those obtained from conventional low solids solvent-based coating compositions. Accordingly, it is an object of the invention to provide novel coating compositions which comprise crosslinkable epoxy ester resins and blocked polyisocyanate crosslinking agent and which provide high crosslinking efficiency and hard, well cured films at minimum bake requirements such as apply to automotive primers. In this regard, it is a particular object of the invention to provide a novel epoxy ester/blocked polyisocyanate thermosetting coating composition of sufficiently low VOC to meet governmental guidelines and yet which can be applied to a substrate by spraying or other known method.

It is another object of the invention to provide a composition which will form a coating on substrate, which coating has advantageous physical properties including, for example, humidity and solvent resistance and corrosion protection for the underlying substrate. Additional aspects and advantages of the invention will be apparent from the following description thereof.

DISCLOSURE OF THE INVENTION

According to the present invention, a novel, organic solvent based, thermosetting resin/crosslinking agent composition, in addition to solvent and any pigments and additives such as, for example, catalysts, flow control agents and the like, comprises epoxy ester resin of the invention and blocked polyisocyanate crosslinking agent including, but not limited to, blocked trifunctional isocyanurate ring containing polyisocyanates and oligoester modified blocked isocyanates. The epoxy ester resins of the invention are of number average molecular weight ($M_n$) about 900 to about 5000, being the reaction product of diepoxide with (i) diphenol in chain extension reaction, (ii) dicarboxylic acid in chain extension reaction and (iii) fatty acid in chain terminating esterification reaction, which chain extension reactions and esterification reaction occur substantially simultaneously. Preferably, suitable catalyst is employed to promote more rapid, more complete and more simultaneous chain extension and esterification reactions.

Particularly preferred compositions of the invention are those formulated as high solids coating compositions adapted to be applied by spraying onto a substrate. Such compositions are especially useful as a primer coat on the bare, unpolished metal surface of an automotive vehicle body. As used herein, a high-solids coating composition is one in which a volatile organic content of about 407 g/l (3.4 lb./gal.) or less yields a viscosity of less than approximately 35 sec. #4 Ford Cup at 27° C. (80° F.).

According to another aspect of the invention, a method of making a corrosion, solvent and humidity resistant coating on a substrate comprises applying to the substrate the novel, solvent based, thermosetting coating composition of the invention and subsequently subjecting the coating to an elevated temperature for a time period sufficient to substantially cure the coating layer. Typically, the novel coating compositions of the invention can be cured by heating to between about 100° C. (212° F.) and about 230° C. (445° F.), for a time period sufficient to yield a cured coating, for example for about 15 to about 60 minutes. According to preferred embodiments of the invention, the coating composition can be sufficiently cured for good coating properties by heating to about 120° C. (250° F.) for about 15 minutes but, in addition, such preferred composition will tolerate curing at up to about 200° C. (392° F.) for as much as about 60 minutes without substantial lose of such advantageous coating properties.

The coating compositions of the present invention have been found especially advantageous for use as high solids primer compositions suitable to be applied by spraying techniques. More specifically, high solids coating compositions according to the invention, formulated, for example, at VOC as low as about 347 g/l (2.9 lb./gal.) to about 490 g/l (4.1 lb./gal.) are found to have viscosity as low as about 15 to about 45 sec. #4 Ford Cup and so are well suited to spray application techniques at 27° C. High solids coating compositions according to preferred embodiments are found to have viscosity as low as about 15 sec. to about 25 sec., #4 Ford Cup at VOC of about 431 g/l to about 467 g/l (3.6 to 3.9 lb./gal.). Accordingly, the coating compositions of the invention provide ease of material handling and less expense than previously known coating compositions which were sprayable only at higher VOC. Furthermore, the coating compositions of the invention can be used to meet or exceed governmental guidelines regarding hydrocarbon emissions with a reduction or elimination of emissions treatment and emissions treatment equipment. In addition, reduction in the amount of hydrocarbon solvent used in the coating composition provides direct cost advantage.

Unlike various previously suggested high solids coating compositions, the coating compositions of the present invention provide the above-mentioned low VOC and cure-response advantages without sacrifice of advantageous physical properties in the cured coating. On the contrary, when applied, for example, over a metallic substrate such as when applied as an automotive vehicle primer coat over bare sheet steel, cured coatings according to the invention have been found to provide excellent adhesion to the substrate, excellent humidity resistance, and excellent corrosion resistance in comparison to other commercially available high solids coating compositions of similar nature.

Other features and advantages of this invention will become more apparent from the succeeding, detailed description thereof including the preferred embodiments and best mode of carrying out this invention.

DETAILED DESCRIPTION OF THE INVENTION

More specifically, the invention relates to a novel organic solvent based, thermosetting coating composition comprising:

A. epoxy ester resin of number average molecular weight ($M_n$) about 900 to about 5000, being the reaction product of diepoxide, with (i) diphenol in chain extension reaction, (ii) dicarboxylic acid in chain extension reaction and (iii) fatty acid in chain terminating esterification reaction, which chain extension reaction and esterification reactions occur substantially simultaneously at a reaction temperature reaching at least about 135° C., wherein the epoxy functionality, phenol functionality, dicarboxylic acid, carboxyl functionality, and fatty acid carboxyl functionality are employed in relative proportions of about 1:0.2–0.6:0.1–0.4:0-.4–0.9 equivalents, respectively; and B. blocked polyisocyanate crosslinking agent in an amount such that upon deblocking of the blocked isoyanato groups thereof at elevated temperatures during cure of said coating composition, said crosslinking agent provides between about 0.5 and about 1.6 reactive isocyanato groups per group on said epoxy ester resin which is reactive therewith.

Each of the above major components of the compositions as well as other components and other aspects of the invention are described hereinafter in greater detail.

A. Epoxy Ester Resin

It is a significant characterizing aspect of the epoxy ester resin of compositions of the invention that the chain-extension reaction of the diepoxide with dicarboxylic acid and with diphenol and the chain-termination esterification reaction of the diepoxide with fatty acid are carried out simultaneously. While not wishing to be bound by theory, it is presently understood that the esterification reaction of the carboxyl functionality of the fatty acid with the epoxy functionality of the diepoxide proceeds at approximately the same or similar rate as the chain extension reaction of the phenolic hydroxy functionality of the diphenol with the epoxy functionality and at very nearly the same or similar rate as the chain extension reaction of the carboxyl functionality of the dicarboxylic acid with the epoxy functionality, given the reaction conditions of the invention as specified herein. Likewise, reaction of the hydroxyl functionality (generated by the aforesaid chain extension and chain termination reactions) with the carboxyl functionality of the fatty acid would proceed at very nearly the same or similar rate as the reaction of such hydroxyl functionality with the carboxyl functionality of the dicarboxylic acid.

Carrying out these reactions simultaneously produces a resin comprising a mixture of reaction products of diverse molecular structures, not merely a series of analogs of the same structure. That is, while not wishing to be bound by theory, it is presently understood that in the course of the simultaneous chain extension and chain termination reactions, the epoxide functionality of the diepoxide (and the epoxide functionality of each chain extended intermediate reaction product) reacts with the dicarboxylic acid, diphenol or fatty acid in random sequence. Thus, each chain extended reaction product in the epoxy ester resin of the invention, having followed a certain reaction sequence, would differ from reaction products of different reaction sequence. In addition to reaction products of diverse molecular structures, reaction of the diepoxide (and of the epoxy functional chain extended intermediate reaction products) simultaneously with the dicarboxylic acid and with the diphenol and with the chain terminating fatty acid is seen to yield a product epoxy ester resin of exceptionally wide molecular weight distribution such as, for example, from about 600 or less to about 12,000 or more. A significant advantage of the invention which is presently understood to stem, in part, from the simultaneous reaction, and particularly from such diversity of molecular structure and wide molecular weight distribution of the epoxy ester resin, is the surprisingly low viscosity of the coating compositions comprising these resins. More specifically, the coating compositions of the invention are found to have a significantly lower viscosity at a given solids content (by weight) than many comparable, commercially available high solids coating compositions. Accordingly, the coating composition of the invention can be sprayed or otherwise applied to a substrate at significantly higher solids content and, thus, require significantly lower VOC. Such reduced viscosity and increased solids content provides a highly significant advance in the art for all of the reasons discussed above, including reduced cost of material handling, reduced emissions of volatile organics, reduced cost of compliance with government guidelines, and other related advantages.

It is seen to be another consequence of the exceptionally wide molecular weight distribution and diversity of molecular structure of the epoxy ester resin of the invention that the glass transition temperature (Tg) of the novel epoxy ester resin of the invention is advantageously low. More accurately, it is presently understood that the lower molecular weight fraction of the epoxy ester resin and any unreacted monomer act in the nature of a plasticizer for the resin to effectively provide a lower apparent Tg. In any event, it is significant that the low Tg is achieved, since low Tg is well known to provide an improved, smoother surface on the cured coating since, during heating to cure the coating, after it reaches its Tg and before it substantially cures at its cure temperature, the coating can flow and become smooth. Thus, the lower Tg provides a longer time period during which the coating can flow and become smooth and thus improve the surface quality of the cured coating. In addition, the wide molecular weight distribution of the epoxy ester resin components is believed to contribute, in part, to the advantageous flexibility of the cured coating of the invention. Such high flexibility in conjunction with high aromatic content is especially advantageous in view of the very significant cost advantage of aromatic over aliphatic feedstocks.

Further, it is now believed that aromatics in a coating composition, such as a primer composition for a metal substrate, are more resistant to hydrolysis than are aliphatics. Accordingly, while again not wishing to be bound by theory, it is possibly believed that the high aromatic content of the epoxy ester resin of the invention explains in part the exceptional corrosion protection found to be provided by the novel coatings of the present invention. This is especially the case, for example, according to preferred embodiments of the invention further discussed below, wherein the diepoxide reactant as well as the diphenol provides aromatic units to the resin. In addition, it is presently understood that the phenolic oxygens introduced into the epoxy ester resin by the chain extension reaction of phenol with epoxy, advantageously provide excellent adhesion to metal substrate, for example steel substrate. Thus, the high aromatic content of the cured coating and its excellent adhesion each enhances the advantage provided by the other to yield the above-mentioned exceptional corrosion protection of the cured coatings of the invention.

According to a most prefered embodiment of the invention, further discussed below, acyclic aliphatic dicarboxylic acid is employed in the synthesis of the epoxy ester resin. According to this embodiment, the epoxy ester resin reaction product comprises both aromatic and aliphatic moieties in random sequence and distribution. While, again, not wishing to be bound by theory, it is presently understood that the aromatic units of the diphenol and the aliphatic units of the dicarboxylic units each enhance the advantages of the other in an unexpected and synergistic manner. More specifically, the aliphatic units are seen to provide flexibility to the epoxy ester resin while the aromatic units, as mentioned above, provide moisture and corrosion resistance. Thus, the epoxy ester resin reaction product provides a cured coating having both good flexibility and good moisture and corrosion resistance.

The diepoxide reactant suitable for the epoxy ester resin can be any of numerous diepoxides including many which are commercially available and which will be apparent to the skilled of the art in view of the present disclosure. While, ultimately, the choice of reactants for preparing the epoxy-ester resin will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gellation, can be more easily avoided. Preferably, the diepoxide has a number average molecular weight ($M_n$) between about 100 and about 1000, and more preferably between about 100 and about 600. Numerous such preferred diepoxides are readily commercially available, for example, bisphenol-A epichlorohydrin epoxy resin, for example, the Epon (trademark) series, Shell Chemical Company, Houston, Tex., and the DER (trademark) series, Dow Chemical Company, Midland, Mich. Also preferred are cycloaliphatic diepoxy resins, for example, the Eponex (trademark) series, Shell Chemical Company, Houston, Tex., hydantoin epoxy resins such as, for example, Resin XB2793 (trademark), Ciba-Geigy Corporation, Ardsley, N.Y., and any of a wide variety of acyclic or cyclic aliphatic diepoxides such as, for example, 1,4-butanediol diglycidyl ether and 4-vinylcyclohexene dioxide and the like. Among those listed, diglycidyl ether bisphenol-A resins or higher molecular weight analogs thereof, are most preferred in view of their cost and commercial availability, for example, Epon 828 (trademark) and Epon 829 (trademark), of the Epon (trademark) series mentioned above. The higher molecular weight members of the Epon (trademark) series are suitable for use where higher molecular weight epoxy ester resins are desired. Generally, however, such higher molecular weight resins provide coating compositions of somewhat higher viscosity (or lower solids content). Additionally, it should be recognized that the higher molecular weight members of the Epon series, for example Epon 1001 and Epon 1004, may be somewhat less preferred, since these bear hydroxyl functionality which may undergo undesirable side reactions with, for example, epoxy functionality. The result can be undesirable resin properties and gellation. Other suitable diepoxides for use in synthesizing the epoxy-ester resin of the invention are commercially available and will be apparent to the skilled of the art in view of the present disclosure. Also, it will be understood from the foregoing that any mixture of compatible diepoxides may be used.

In addition to the diepoxide, a portion of the epoxy functionality can be provided by any compatible mono-epoxy compound or, more suitably, polyepoxy compound or mixture of compounds having three or more epoxy groups per molecule. Suitable such polyepoxides include, for example, those of molecular weight about 200 to about 800. The polyepoxide can be essentially any of the well known types such as polygylcidyl ethers of polyphenols. These can be produced by etherification of a polyphenol with epihalohydrin in the presence of alkali. It will be recognized by the skilled of the art in view of the present disclosure, that in some instances, particularly where a coating composition of high solids content is less important, it may be desirable to employ polyepoxides having higher molecular weights. Preferably, any such polyepoxide contains free hydroxyl groups in addition to epoxide groups.

While polyglycidyl ethers of polyphenols can be employed, it is frequently desirable in such compositions to react a portion of the reactive sites (hydroxyl or in some instances epoxy) with a modifying material to vary the film characteristics of the resin. The epoxy resin may be modified, for example, with isocyanate group containing organic materials or other reactive organic materials.

Another quite useful class of polyepoxides are the novolak resins including, for example, the novalak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin.

The diphenol reactant suitable for the epoxy ester resin of the present invention includes numerous commercially available materials, many of which will be readily apparent to the skilled of the art in view of the present disclosure. Preferred diphenols have the general formula (I):

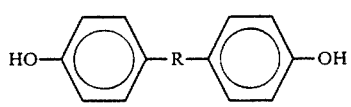

wherein R is a divalent linking moiety substantially unreactive with the diepoxide resin. Preferably R is a divalent organic linking moiety, for example $(CH_2)_n$ where n is preferably from about 1 to about 8, $C=O$, and the like, although inorganic moieties, for example sulfonyl and the like, are also suitable. Diphenols of this character have been found to provide good reactivity with the preferred diepoxides described above and to provide, ultimately, cured coatings of the invention having excellent physical properties, most notably excellent corrosion protection. It will be apparent to the skilled of the art in view of the present disclosure that R should be substantially unreactive with the fatty acid employed for the epoxy ester resin. Particularly preferred diphenols include those according to formula (I) above, wherein R is selected from the group comprising a straight or branched alkylene or alkylidene moiety of one to about 10 carbons, preferably having three to four carbons and most preferably having the general formula

wherein R' and R" are the same or different and each is a monovalent organic moiety preferrably selected from the group comprising hydrogen and lower alkyl, of about one to four carbons, most preferably one or two carbons, and the like or a mixture of any of them. Preferably the diphenol has a number average molecular weight ($M_n$) between about 180 and about 500, more preferably between about 180 and about 250. Diphenols within this range, employed with the preferred diepoxides described above, and suitable fatty acid are found to provide epoxy ester resins comprising mixed reaction products of particularly wide molecular weight distribution, which resins (as discussed above) are found to provide coating compositions of the invention having especially advantageous physical properties including low Tg and good corrosion protection. Such diphenols include, for example bisphenol-A, which is most preferred, bisphenol-B and the like and a compatible mixture of any of them. As used herein the term diphenol may include, for example, compounds comprising a single dihydroxy substituted phenyl ring such as benzenediol. More preferred, however, are those diphenols providing two terminal, mono-hydroxy substituted phenyl rings such as in formula (I), above. Other examples of diphenols are bis-(4-hydroxy-tert-butylphenyl)-2,2-propane, bis-(2-hydroxy-naphthyl)-methane and 1,5-dihydroxynaphthalene. Other suitable diphenols for the epoxy ester resin of the present invention will be apparent to the skilled of the art in view of the present disclosure.

The dicarboxylic acid reactant suitable for the epoxy ester resin of the present invention includes numerous commercially available materials, many of which will be readily apparent to the skilled of the art in view of the present disclosure. Suitable dicarboxylic acids include saturated or unsaturated, acyclic or acyclic aliphatic or aromatic dicarboxylic acids or a mixture thereof. Acyclic aliphatic dicarboxylic acids are generally preferred in view of the enhanced flexibility they provide to the cured coatings of the invention. Preferred dicarboxylic acids have the general formula (I):

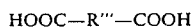

wherein R''' is a divalent linking moiety substantially unreactive with the diepoxide resin. It will be apparent to the skilled of the art in view of the present disclosure, that R''' should be substantially unreactive also with the fatty acid employed for the epoxy ester resin, with hydroxy functionality (generated in the chain-extension reaction) and, at least at storage temperatures, with the crosslinking agent employed in the coating composition. Preferably R''' is a divalent, organic linking moiety. Particularly preferred are those dicarboxylic acids wherein R''' is selected, from the group comprising a straight or branched alkylene or alkylidene moiety, preferably of about 4–42 carbons, for example, $(CH_2)_n$ where n is preferably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably excellent flexibility and corrosion protection. Preferably the dicarboxylic acid has a number average molecular weight ($M_n$) between about 145 and about 1000, more preferably about 570. Dicarboxylic acids within this range, employed with the preferred diepoxide and preferred diphenol, described above, and preferred fatty acid, described below, are found to provide epoxy ester resins comprising mixed reaction products of particularly wide molecular weight distribution, which resins (as discussed above) are found to provide coating compositions of the invention having especially advantageous physical properties including low Tg and good humidity and corrosion protection.

Exemplary dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. While dicarboxylic acids according to formula (I) can be used, wherein R''' is an alkylene chain of less than 4 carbons, for example, oxalic acid, malonic acid, succinic acid, glutaric acid and the like, these are less preferred in view of the somewhat lesser degree of flexibility provided thereby. Preferably the dicarboxylic acid provides two terminal carboxyl groups. Similarly, preferred aromatic dicarboxylic acids are those wherein the carboxylic groups are more spaced apart, for example, 1,4-benzenedicarboxylic acid and 2,7-naphthalenedicarboxylic acid.

The most preferred dicarboxylic acids are substantially saturated, acyclic, aliphatic dimer acids, which are well known to the skilled of the art and readily commercially available. These are typically the dimerization reaction products of fatty acids which have from 4 to 22 carbons and a terminal carboxyl group. Of these, dimer acid of 36 carbons is most preferred since it provides excellent reactivity with the preferred diepoxides described above, provides epoxy ester reaction products of advantageously wide molecular weight distribution, and provides, ultimately, cured coatings of the invention having excellent physical properties. In addition, dimer acid of 36 carbons is readily commercially available, for example, as Empol 1014 (trademark), Empol 1016(trademark) and Empol 1018 (trademark), each available from Emery Industries, Inc., Cincinnati, Ohio. It should be recognized that most or all commercially available dimer acids contain some portion of trimer acid, typically, for example, about 5–10% but in some cases as much as 30% or more, and also contain a usually smaller portion of monocarboxylic acid. As used herein, the term "dimer acid" includes those containing such amounts of these materials. Most useful in the present compositions are products that contain mostly dibasic acid and none or low amounts of tribasic and monobasic acids.

Aliphatic dicarboxylic acids are seen to provide additional advantages. In particular, while not wishing to be bound by theory, it is presently understood that epoxy ester resins derived therefrom wet the substrate surface better and, thus, provide enhanced adhesion between the substrate and the cured coating. They also flow better and provide an excellent, smooth surface upon being cured. Also, the aliphatic units provide enhanced flexibility to the cured coating, as noted above, and this flexibility of the coating is seen to provide enhanced impact resistance. In this regard, it is presently understood that in the epoxy ester resins according to preferred embodiments, employing aliphatic dicarboxylic acid and aliphatic fatty acid, the molecular weight distribution is exceptionally wide due to the approximately identical reaction rates of these reactants with the diepoxide. Such exceptionally wide molecular weight distribution further enhances the flexibility of the cured coating.

Where corrosion protection for the substrate is important, it may be preferred to employ dicarboxylic acid according to formula (I) above, wherein R'''is, at least in part, aromatic. As noted above, it is believed that aromatics in a coating composition of the invention, such as a primer composition for a metal substrate, are more resistant to hydrolysis than are aliphatics and, therefore, provide enhanced corrosion and moisture resistance. Of course, the diphenol and, according to preferred embodiments described above, the diepoxide reactant each provides aromatic units to the resin and each would similarly contribute to corrosion and moisture resistance.

Other suitable dicarboxylic acids for the epoxy ester resin of the present invention will be apparent to the skilled of the art in view of the present disclosure.

The fatty acid employed as a chain terminating esterification reactant for the epoxy ester resin of the present invention includes numerous commercially available materials. Suitable fatty acids include those derived from or contained in either animal or vegetable fat or oil. Preferred are fatty acids of from about 8 to about 18 carbons. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolinic or the like and mixtures of those acids, and can be used together with a suitable inhibitor for the polymerization-type reaction such as hydroquinone or the like, of which many are commercially available and will be apparent to the skilled of the art in view of the present disclosure. In addition, aromatic fatty acids are commercially available and can be employed. The aliphatic fatty acids are preferred, however, in view of the enhanced coating flexibility they provide. Especially preferred for use are the substantially saturated fatty acids such as Soya fatty acid which is most preferred, and butyric, lauric, palmitic and stearic fatty acids and the like or a mixture of any of them. These are relatively inexpensive and have been found to provide good reactivity with the preferred diepoxides described above. For convenience of use, the fatty acids which are semi-solid or liquid at room temperature are generally preferred over the solid fatty acids.

The epoxy ester resin of the invention can be made according to reaction conditions now specified employing techniques which are well known and which will be readily apparent to the skilled of the art in view of the present disclosure. The chain extension and chain termination reactions occur substantially simultaneously by charging the diepoxide, the diphenol, the dicarboxylic acid and the fatty acid in a suitable reactor and heating the mixture. It should be recognized that to assure rapid and/or more complete reaction of the diepoxide with the carboxyl and phenol functionalities, and to assure that these reactions occur substantially simultaneously, that is, that they proceed substantially concurrently at approximately the same or similar rates, it is usually preferred to have a catalyst present. Alternatively, other techniques, for example, higher reaction temperatures and/or longer reaction times, or relatively greater proportion of diphenol (since, absent catalyst, phenol functionality is believed to be somewhat less reactive with diepoxide than is carboxyl functionality) can be used to provide substantially simultaneous reactions. The use of catalyst, however, has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commercially available and include, any of the well known catalysts for epoxy-carboxylic/epoxy-phenol reactions such as, for example, sodium carbonate which is preferred, and lithium neodecanoate, lithium naphthenate, lithium nanoate, other known organometallic catalysts and tertiary amine catalysts and the like or a compatible mixture of any of them. Others will be apparent to the skilled of the art in view of the present disclosure.

The reaction mixture is generally heated to at least about 137° C. (280° F.), preferably at least about 176° C. (350° F.). In some instances, in the presence of catalyst, exothermic reaction will proceed with or without further heating, and the reaction mixture will then reach about 193° C.-232° C. (380° F.-450° F.), depending upon the batch size and reactor vessel insulation, etc. In the absence of catalyst, such exotherm is typically not observed and continued heating is required to maintain the reaction temperature, preferably at about 176° C.-193° C. (350° F.-379° F.). The progress of the reaction can be followed by measuring acid number. After the acid number measurements have indicated the reaction is sufficiently completed, preferably at acid number 7 or less, the resin may be diluted with suitable solvent in order to reduce the viscosity to a desirable level for use or storage, for example about 80% solids.

Since, in the preferred embodiments described above, the chain extension reaction of the epoxide functionality with the phenol functionality and the carboxyl functionality of the dicarboxylic acid proceeds at approximately the same rate as the chain termination reaction of the epoxide functionality with the carboxylic functionality of the fatty acid, and since these reactions are carried out simultaneously to yield the epoxy ester resin of the invention, it should be recognized that the relative proportions of the reactants in the reaction mixture can significantly effect the properties of the product resin. Accordingly, it has been found that the reactants are preferably present in amounts which provide the reactive functionality in the relative proportions of one equivalent of epoxy functionality to about 0.2 to about 0.6 equivalent of phenol functionality, to about 0.1 to about 0.4 equivalent of dicarboxylic acid carboxyl functionality, to about 0.4 to about 0.9 equivalent of fatty acid carboxyl functionality. More preferred relative proportions are one equivalent of epoxy functionality to about 0.4-0.6 equivalent of phenol functionality; about 0.1-0.3 equivalent of dicarboxylic acid carboxyl functionality; and about 0.6-0.8 equivalent of fatty acid carboxylic functionality. Epoxy ester resins provided according to such preferred ranges of reactant amounts have been found to provide coating compositions of the invention having exceptional physical properties, most especially corrosion protection such as, for example, when (spray) applied to a metal substrate such as, for example, bare, unpolished automotive vehicle body sheet steel. Most preferably diepoxide, dicarboxylic acid, diphenol and fatty acid are employed in relative amounts of approximately 1:0.5:0.25:0.8 of functionality, respectively. One most preferred epoxy ester resin for use in composition of the invention comprises the reaction product of diglycidyl ether bisphenol-A resin with bisphenol A, the dimerization reaction product of C-18 fatty acid and Soya fatty acid, wherein these components are employed in relative proportions of about 1:0.2-0.4:0.3-0.5:0.9-1.2 by weight, respectively.

In this regard, while not wishing to be bound by theory, the exceptional corrosion inhibition and other physical properties provided by the coating compositions of the invention are presently believed to stem in large part from a novel chemistry not previously known or suggested. More specifically, it appears that the epoxy ester resins of the invention may comprise, in substantial part, phenol terminated constituents. That is, whereas previously known epoxy adducts suggested for use in coating compositions are reported to be terminated by esterified epoxy groups, it now appears that the epoxy ester resins of the present invention are, in substantial part, phenol terminated. This phenomenon is presently understood to be a consequence of the reaction of both the phenol functional reactant and the carboxylic functional reactants simultaneously with the diepoxide in the relative proportions of reactants specified above. The carboxyl functionality competes with the phenol functionality for reaction with the epoxy functionality. Consequently, (notwithstanding the excess of epoxy relative to phenol in the preferred embodiments described above) reaction products bearing terminal phenol are present upon exhaustion of unreacted epoxy functionality. It would have been expected that the carboxyl functionality would react in major part with the pendent hydroxy groups of the chain-extended intermediate reaction products. However, such reaction would, of course, produce a water molecule, and upon distillation of the epoxy ester resin reaction product, little more water is found than would be contributed as impurity in the reactants. Accordingly, while a portion of the dicarboxylic acid and fatty acid may react with such pendent hydroxy groups, it seems clear that a far larger portion than would be expected reacts with epoxy (in competition with the phenol functionality) such that the epoxy ester resin of the invention is, in substantial part, phenol terminated. One most significant advantage of this novel chemistry is believed to be the excellent cure response of the coating compositions of the invention. The terminal phenol moiety is believed to provide exceptionally high reactivity with deblocked isocyanate crosslinking agent at elevated (cure) temperatures.

B. Crosslinking Agent

The crosslinking agent employed in the novel solvent based coating compositions of the invention comprises blocked polyisocyanate. As noted above, the novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanato groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanato groups are present. The blocking agent may be represented by the formula BH and may be selected from numerous materials, hereinafter discussed, which bear an active hydrogen.

The blocked polyisocyanate crosslinking agent is included in compositions of the invention in amounts such that upon deblocking of the blocked isocyanato groups at the cure temperature of the composition, the crosslinking agent will provide between about 0.5 and about 1.6, preferably between about 0.8 and about 1.3, reactive isocyanato groups per reactive group on the film forming resin of the coating composition as described above. The overall reaction involved in the deblocking of an isocyanato group is as follows:

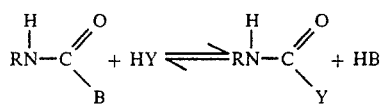

There are two courses that the reaction can follow:
Elimination-Addition

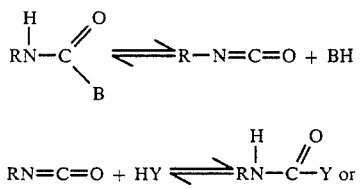

Substitution

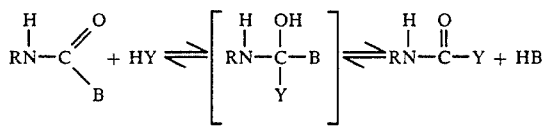

Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanate; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenylmethane-4,4',4''-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

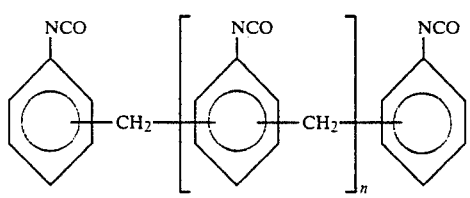

wherein n equals 1 to 3. The compounds sold under the tradename "PAPI" by the Upjohn Chemical Company of Kalamazoo, Mich. have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkylmonoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are ε-caprolactam, γ-butyrolactam and pyrrolidone, while suitable triazoles include compounds such as 1,2,4 triazole, 1,2,3 benzotriazole, 1,2,3 tolyl triazole and 4,5 diphenyl-1,2,3 triazole. Particularly preferred active hydrogen containing blocking agents are methylethyl ketoxime and 2-ethylhexanol.

1. Isocyanurate Ring Containing Blocked Isocyanate Compounds

Within the scope of the above general class of blocked polyisocyanate crosslinking agents, a particular class type of blocked polyisocyanate crosslinking agent which may be employed in the novel solvent based coating compositions of the invention comprises isoycanurate ring containing blocked isocyanate compounds. In general, these blocked polyisocyanates may be formed by blocking with the aforementioned blocking agent isocyanurate ring containing polyisocyanates. These compounds may be formed by cyclotrimerization of difunctional isocyanates according to the following equation:

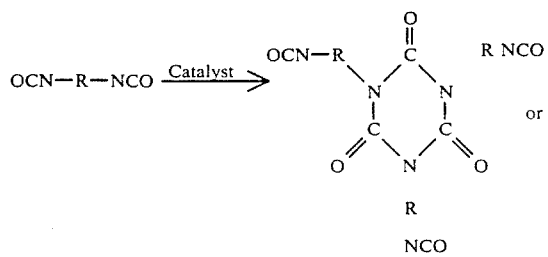

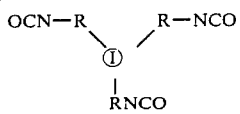

where Ⓘ is an isocyanate ring. Usually, the reaction does not stop in this stage and continues through the formation of polyfunctional oligomers or a mixture of such oligomers with a portion of the trifunctional polyisocyanate shown above. The polyfunctional oligomers may be represented by the following

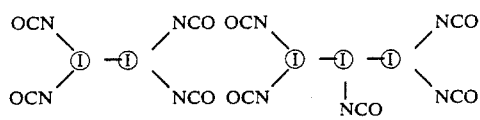

Mixtures of trifunctional product and various polyfunctional oligomers are commercially available.

A particular desirable blocked polyisocyanate crosslinking agent is the blocked form of the pure trifunctional isocyanurate represented by the following formula:

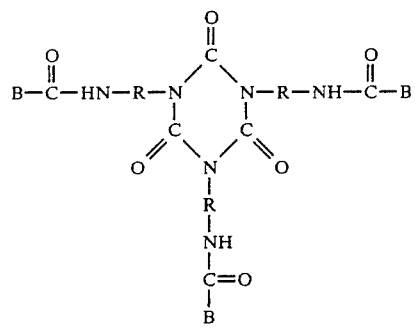

wherein R is selected from the group consisting of aliphatic, cycloaliphatic and aromatic groups and combinations thereof and B is the residue of an active hydrogen containing blocking agent. More specifically, this compound, which is disclosed in copending application Ser. No. 368,178 filed Apr. 14, 1982, is formed by (A) reacting (i) organic diisocyanate represented by the formula OCN—R—NCO wherein one of the isocyanate groups is more reactive than the other and (ii) sufficient active hydrogen containing blocking agent as described above represented by the formula BH to react substantially all of the more reactive isocyanate groups; and (B) cotrimerizing the reaction product of (A) in the presence of a catalyst such that the isocyanurate ring containing compound is formed by the reaction of 3 moles of the blocked diisocyanate.

The organic diisocyanates employed in the preparation of the crosslinking agent may be selected, as indicated above, from the group consisting of aliphatic, cycloaliphatic and aromatic diisocyanates and hybrids of those diisocyanates, provided that any of the diisocyanates selected, as also noted above, must have one isocyanate group which is more reactive than the other. Numerous such diisocyanates will be apparent to those skilled in the art; representative of those organic diisocyanates which are suitable for use in the preparation of the trifunctional isocyanate crosslinking agents of the invention are
1-isocyanato-1(p-phenyl isocyanate)methane;
1-isocyanato-2(p-phenyl isocyanato)ethane;
4,4′-diisocyanato-2-nitro-biphenyl; and diisocyanates having either the formula

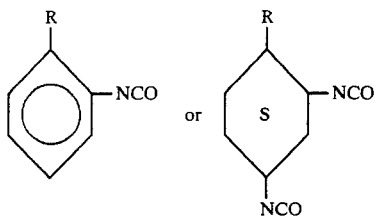

wherein R is selected from the group consisting of methyl, ethyl, t-butyl, chloro, bromomethyl, ethoxy, iso-butoxy, isopropyl, trichloromethyl and methoxy. Particularly preferred organic diisocyanates for use in preparation of this crosslinking compound are toluene diisocyanate and isophorone diisocyanate.

The intermediate blocked isocyanate reactant is formed by reacting a sufficient quantity of the blocking agent with the organic diisocyanate to insure that substantially all of the more reactive isocyanate groups of the organic diisocyanate reactant are reacted. This may be determined by NCO group titration. Generally, it is desirable to employ the organic diisocyanate and the active hydrogen containing blocking agent in a molar ratio of about 1:1.

After forming the above partially blocked organic diisocyanate intermediate, that intermediate is cotrimerized to form the pure trifunctional isocyanurate ring containing blocked isocyanate compound characterized by the above formula. Generally, the cotrimerization of the reaction product takes place by trimerizing of three moles of half-blocked diisocyanate to form one mole of the trimerized product.

Light liquid organic substances may be used as the reaction medium provided that the substance has no functionality capable of reacting with an isocyanato group. Examples of such organic reaction medium liquids include, for example, acetone, ethylacetate, and halogen-substituted alkanes such as, for instance, methylene chloride, chloroform, ethylidene chloride, vinylidene chloride, monofluorotrichloromethane, chlorodifluoromethane, dichlorodifluoromethane and the like. Other suitable solvents include xylene, cellosolve acetate, toluene, etc. Still other suitable solvents will be apparent to those skilled in the art.

Catalysts for the above reaction include amine catalysts which are known to the art, such as, for example, tertiary amines such as triethylamine, tributylamine, N-methylmorpholine, N-ethylmorpholine, N-cocomorpholine, N,N,N′,N′-tetramethylethylenediamine, 1,4-diazabicyclo-(2,2,2)-octane N-methyl-N′-dimethylaminoethylpiperazine, N,N-dimethylbenzylamino, bis-(N,N-diethylaminoethyl)-adipate, N,N-diethylbenzylamine, pentamethyldiethylenetriamine, N,N-dimethylcyclohexylamine, N,N,N′,N′-tetramethyl-1,3-butanediamine, N,N-dimethyl-beta-phenylethylamine, 1,2-dimethylimidazole, 2-methylimidazole and the like.

Tertiary amines having active hydrogen atoms for opposing isocyanate groups are for example illustrated by triethanolamine, N-ethyldiethanolamine, N-N-dimethylethanolamine as well as their reaction products with alkylene oxides, such as propylene oxide and/or ethylene oxide.

Other amine catalysts, include silamines having —C—Si bonds such as those described in German Pat. No. 1,229,290. These include, for example, 2,2,4-trimethyl-2-silamorpholine,1,3-diethyl-aminomethyltetramethyl-disiloxane and the like.

Metal compounds and, in particular, organic tin compounds can also be used as catalysts. Suitable organic tin compounds, include tin (II) salts of carboxylic acids, such as tin(II)-acetate, tin(II)-octoate, tin(II)-ethylhexoate and tin(II)-laurate and the dialkyl tin salts of carboxylic acids such as dibutyltin diacetate, dibutyl-tin dilaurate, dibutyl-tin maleate or dioctyl-tin diacetate.

Further instances of suitable catalysts are described in detail in Kunstoff-Handbuch, Vol, VII, Vieweg and Hochtlen, Carl Hanser Verlag, Munchen, 1966, at pp. 96-102.

The actual synthesis of the trifunctional isocyanurate ring containing blocked polyisocyanate crosslinking agent is carried out in two stages. In the first stage the blocking agents are reacted selectively with the more reactive isocyanate group at low temperature, for example, below 50° C. In the second stage the half-blocked isocyanate is cyclotrimerized at a temperature in the range of generally 80° C.–125° C. using a catalyst such as one of those listed above (e.g., potassium octoate) to form the isocyanurate crosslinker.

2. Oligoester Modified Blocked Polyisocyanates

As noted above, still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanto group more reactive than the other, with the more reactive isocyanato first being blocked with a blocking agent and the remaining isocyanato group when being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982. The hydroxy functional oligoesters within the useful class of materials (i) have a number average molecular weight ($M_n$) of between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and mono- or polyepoxide, preferably monoepoxide;

(d) the esterification reaction product of monocarboxylic acid and hydroxy functional mono- or polyepoxide, preferably monoepoxide; and (e) mixtures of (a)-(d).

The first type of hydroxy functional oligoester noted above is preferably prepared by reacting approximately 1 to 1 equivalent quantities of polycarboxylic acid with alkylene oxide in the presence of an esterification catalyst. A small excess of alkylene oxide is desirable, but not necessary. Among the preferred carboxylic acids for preparing this type of oligoester are aliphatic and aromatic acids including succinic acid, glutaric acid, adipic acid, pimelic acid, suberic acid, azelaic acid, sebacic acid, dodecane dicarboxylic acid, dimer fatty acid, trimer fatty acid, phthalic acid, isophthalic acid, terephthalic acid, and hexahydrophthalic acid. Still other useful acids are various carboxy bearing polymers including carboxy terminated polyesters, carboxy terminated polybutadienes, and the like. Such materials will be apparent to those skilled in the art. Although numerous acids may be employed to make this type of oligoester, dicarboxylic acids containing 6 to 12 carbons are most preferred. Of course, mixtures of the various di- or polycarboxylic acids may also be employed.

Monoepoxides useful in preparing this first type of oligoester are epoxides which contain a three-membered epoxide group. Preferred epoxides are alkylene oxides of two to three carbon atoms, such as ethylene oxide and propylene oxide. Among the many other useful epoxides which will be apparent to those skilled in the art are 1,2 butylene oxide, 2,3-butylene oxide, 1,2 hexylene oxide, 1,3-epoxydecane, 1,2-epoxydodecane, cyclopentene oxide, styrene oxide, butyl glycidyl ether, epichlorohydrin, etc. Of course, mixtures of monoepoxides may also be used.

The second type of hydroxy functional oligoester may be prepared by reacting one or more polyepoxides with one or more monocarboxylic acids bearing no hydroxyl functionality, preferably in an approximate equivalent ratio. Useful polyepoxides contain at least two epoxy groups, with diepoxides being most preferred. Among the preferred diepoxides usefin in the preparation of such an oligoester are diglycidyl ether of bisphenol A and butyl diglycidyl ether. Monocarboxylic acids useful may be selected from aliphatic, cycloaliphatic, and aromatic carboxylic acids and mixtures thereof. Exemplary of the many acids which may be employed are benzoic acid, t-butyl benzoic acid and acetic acid. While preferred carboxylic acids are those containing no ethylenic unsaturation such unsaturated acids may also be used. Preparation of oligoesters from monocarboxylic acids and polyepoxides is well known in the art and is further described, for example, in U.S. Pat. Nos. 2,456,408 and 2,653,141.

Preparation of hydroxy functional oligoester by the esterification reaction of hydroxy functional monocarboxylic acid with an epoxide is described in U.S. Pat. No. 3,404,018, the teachings of which are hereby incorporated by reference. The epoxides employed in accordance with the teachings of that patent are polyepoxides, while oligoesters of this invention are prepared by employing monoepoxides, such as an alkylene oxide, and hydroxy functional monocarboxylic acids. Numerous monoepoxide materials suitable for this purpose will be apparent to those skilled in the art.

It will be appreciated that various combinations of carboxylic acids and epoxides within the scope of the claimed invention other than those specifically discussed above may be reacted in order to provide oligoesters useful in the high solids compositions of the invention. For example, oligoesters bearing hydroxy functionality other than that produced by the esterification reaction may be produced by reacting not just a hydroxy bearing carboxylic acid with an epoxide as discussed above, but by reacting carboxylic acids and epoxides, either of which bears hydroxyl functionality. Examples of such oligoesters are (i) trihydroxy oligoesters prepared by reacting a monocarboxylic acid with a monohydroxy diepoxide such as hydroxy glycidyl ethers of bisphenol A and aliphatic hydroxy glycidyl resins, (ii) trihydroxy oligoesters prepared by reacting a monohydroxy monocarboxylic acid such as 3-hydroxybutyric acid, 4-hydroxycyclohexyl carboxylic acid or 4-methylol benzoic acid with a monohydroxy monoepoxide such as glycidol and 1,4-butanediolmonoglycidyl ether; or (iii) trihydroxy oligoesters prepared by reacting a monocarboxylic acid with a dihydroxy monoethoxide such as acetic acid with 2,3-epoxy-1,4-butane diol.

It will be appreciated by those skilled in the art that all of the above are merely exemplary of the various oligoesters falling within the scope of those useful in compositions of the invention.

Noninterfering functionality present in the carboxylic acid or epoxide molecule employed in preparing any of the above hydroxy functional oligoesters may yield certain specific coating properties which may be desirable. Such functionalities and their effects which will be apparent to those skilled in the art may include, for example, a halogen, an ester linkage, etc. More specifically, for example, an oligoester prepared by reaction of chlorendic acid and propylene oxide when formulated with a polyisocyanate in accordance with the invention yields a polyurethane coating which exhibits fire retardant properties.

Preferred esterification catalysts useful in preparation of hydroxy functional oligoesters by the esterification reactions discussed above are the tetralkyl ammonium salts such as tetra methyl ammonium chloride, tetraethyl ammonium bromide and trimethyl benzyl ammonium chloride as well as metal salts of a carboxylic acid such as potassium octoate or chromium III octoate. Other useful esterification catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylandine, quinoline, b-picoline, ethylpyridine; and the like. Still other catalysts known to catalyze carboxy/epoxy reactions will be apparent to those skilled in this art.

As noted above, the first type of oligoester modified blocked polyisocyanate crosslinking agent is prepared by (i) reacting organic diisocyanate bearing the isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic; therefore, the diisocyanate and the blocking agent are preferably admixed at temperatures no higher than about 80° C., preferably below about 50° C., to minimize the exothermic effect.

This intermediate is next reacted with the oligoester diol or triol described above so as to react substantially all free or unblocked isocyanato groups of the diisocyanate/blocking agent intermediate with hydroxyl groups of the oligoester. The reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resulant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

C. General Discussion—Other Aspects of Invention and Other Components

The coating compositions of the invention have been found to provide a cured coating having the advantageous physical properties described above, over a wide range of cure temperatures. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing porcess or thereafter. Preferrably, the cured coating is substantially free of solvent.

Sufficient solvent is used to reduce the viscosity of the coating composition to a level suitable for application to the substrate in the desired manner. While conventional epoxy ester automotive spray-applied primer coating compositions are known to require a volatile organic content of about 540 g/l, comparable coating compositions comprising instead the novel epoxy ester resins of the present invention require as little as 430 g/l or less VOC to provide a viscosity of 18 sec., #4 Ford Cup at 27° C. (80° F.), which is suitable for spray application techniques. It is generally preferred that sufficient solvent be used to provide a viscosity of about 18 to about 22 seconds, #4 Ford Cup at 27° C. (80° F.) for a coating composition which is to be sprayed onto a substrate. Of course, the coating compositions of the invention need not be formulated as a "high solids" composition. Rather, it can have a higher VOC to provide a lower viscosity. Similarly, the coating compositions of the invention need not be formulated as a sprayable composition. Rather, it can have an even higher solids content and viscosity.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

According to another aspect of the invention, a coating on a substrate is provided, which coating comprises the crosslinked polymer product following cure of a coating composition of the invention. The coating composition can be a low solids composition, that is, it can have a high VOC, but generally a high solids composition, that is, one having a low VOC is preferred for the reasons given above. It can be applied by any conventional method, including brushing, dipping, flow coating, spraying, etc. Spraying will generally be preferred, for example, for applying the compositions as an automotive primer. For the reasons discussed above, the novel epoxy ester resins of the invention are especially advantageous for formulating high solids coating compositions. For this purpose, the epoxy ester resin of the invention preferably has a number average molecular weight ($M_n$) of about 900 to about 2000. In this regard, coating compositions of the invention employing preferred epoxy ester resins described above are suitable to be applied to a substrate by spraying even though formulated at volatile organic content levels as low as about 347–467 g/l (2.9–3.9 lb./gal.), a more preferred range being about 395–467 g/l (3.3–3.9 lb./gal).

Curing the coating composition requires baking for sufficient time at sufficiently elevated temperature to react the crosslinking agent with the epoxy ester resins. The time and temperature required to cure the coating are interrelated and depend upon the particular epoxy ester resin, crosslinking agent, solvent and other materials, if any, and the amount of each comprising the coating composition. Employing a volatile organic content of about 431 g/l (3.6 lb./gal.) and selecting preferred components as described above, the bake time and temperature is typically about 15 to about 60 minutes and about 135°–165° C. (275°–325° F.), respectively. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (399° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shutdowns are recovered with cured and unharmed coatings.

High solids coating compositions according to the present invention, comprising the novel crosslinkable epoxy ester resins of the invention, especially the preferred resins described above and blocked polyisocyanate crosslinking agent, especially the preferred materials described above, have been found to afford cured coatings with corrosion resistance comparable to conventional epoxy ester based, low solids sprayable coating compositions. The significant reduction in volatile organic content presents, therefore, a highly advantageous advance in the art.

A most preferred use of the coating composition of the invention is as a high solids sprayable primer for use on a bare metal substrate such as a household or industrial applicance housing or an automotive vehicle body. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the primer may be as much as 4:1 by weight, respectively, depending, in part, upon the condition of the metal substrate. It is preferred, however, to use a primer having a pigment-to-binder ratio of about 1:1–2:1 by weight, respectively.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, sprayable, automotive vehicle primer, the solvent will comprise preferably about 25 to about 35 percent by weight of the total coating compositions, although of course, larger or smaller amounts may be utilized depending upon the solids content desired. For example, it may be desirable to formulate the primer with a relatively high solids content and then reduce it to spraying consistency prior to the time of application.

The metal substrate can be, for example, aluminum, steel, or phosphated cold-rolled steel. However, any metal used as a construction material is usable. The primer composition may be coated onto the metal base in any conventional manner such as roll coating, brushing, curtain coating, etc. The preferred method of applying the primer composition to the metal is by spraying. The primer is cured at elevated temperatures by any convenient means such as baking ovens or banks of infra-red heat lamps. Suitable curing temperatures are discussed above.

The primer is generally thinned to from about 65 to about 70 percent solids content for spraying purposes with conventional thinners such as aromatic hydrocarbons, commercial petroleum cuts which are essentially aromatic, and the like, and sprayed onto the metal base and cured. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

This example illustrates the preparation of an epoxy ester resin according to the present invention. In a suitable reactor were charged 1248 parts of Epon 829 (trademark) Shell Chemical Company (diglycidyl ether of bisphenol-A), 342 parts of bisphenol-A, 463 parts of Empol 1014[1] and 1400 parts of Soya fatty acid. The temperature of the mixture was brought up to about 177° C. (350° F.) at which point an exothermic reaction took place that raised the temperature up to about 193° C. (380° F.). After 2 hours at this temperature, the acid number was found to be 5.9.

[1]Trademark, Emery Industries, Inc. (dimer acid).

The reaction mixture was then cooled down to about 149° C. (300° F.) and 863 parts of methyl amyl ketone were added. The resulting resin had a viscosity of T½ at 80% solids.

EXAMPLE II–V

Epoxy ester resins according to the invention were prepared in the manner generally of Example I. The components employed are shown in Table I, below. The diepoxide, dimer acid, fatty acid and diphenol, with catalyst (sodium carbonate), if any, were charged in a suitable reactor. The mixture was heated up to about 177° C. (350° F.). At this point, exothermic reaction took place that brought the temperature up to about 188°–199° C. (370° C.–390° F.). The reaction was continued at this temperature until the acid number dropped below 6. Then the product was cooled down to about 121° C. (250° F.) and thinned to 80% non-volatiles be weight with methyl amyl ketone. In Table I, all amounts are shown in parts by weight.

TABLE I

|  | Example | | | |
|---|---|---|---|---|
|  | II | III | IV | V |
| Epon 829[1] | 1248 | 1248 |  |  |
| DER 333[2] |  |  | 1248 |  |
| Epon 828[3] |  |  |  | 1248 |
| Empol 1016 | 463 | 463 | 463 | 463 |
| Bisphenol A | 342 | 342 | 342 | 342 |
| Linseed Fatty Acid | 1400 |  |  |  |
| Pamolyn 200[4] |  | 1400 |  |  |
| Soya Fatty Acid |  |  | 1400 | 1400 |
| Sodium Carbonate |  |  |  | 1.2 |
| Methyl Amyl Ketone | 300 | 300 | 300 | 300 |
| % Non-Volatiles | 80.0 | 79.8 | 79.6 | 79.8 |
| Viscosity | $T_{\frac{1}{2}}$ | $T_{\frac{1}{2}}$ | V | $V_{\frac{1}{2}}$ |
| Acid Number | 5.6 | 4.9 | 5.2 | 5.9 |

[1]Trademark, Shell Chemical Co. (diepoxide; specifically, bisphenol-A epichlorohydrin epoxy resin)
[2]Trademark, Dow Chemical Co. (diepoxide)
[3]Trademark, Shell Chemical Co. (diepoxide)
[4]Trademark, Hercules Incorporated, Wilmington, Delaware (pale, color-stable high purity grade linoleic acid)

EXAMPLE VI

An epoxy ester resin according to the invention was prepared. In a suitable reactor were charged 884 parts of Araldite RD-2 (trademark) Ciba-Geigy Corporation (diglycidyl ether of 1,4-butane diol), 342 parts of bisphenol-A, 463 parts of Empol 1014, 1400 parts of Soya fatty acid and 1.5 parts of sodium carbonate. The temperature of the mixture was brought up to about 177° C. (350° F.) at which point an exothermic reaction took place that raised the temperature up to 193° C. (380° F.). After one hour at this temperature, the acid number was found to be 5.8. The reaction mixture was then cooled down to about 149° C. (300° F.) and 772 parts of methyl amyl ketone were added. The resulting resin had a viscosity of P at 80% solids.

EXAMPLE VII

A millbase, that is, a composition pigment paste was prepared by grinding in a ballmill the following mixture:

| Composition | Parts |
|---|---|
| Barium Sulfate | 1626 |
| Red Iron Oxide | 60 |
| Titanium dioxide | 105 |
| Silica | 75 |
| Strontium chromate | 99 |
| Polyethylene Wax | 48 |
| Xylene | 200 |
| Toluene | 240 |
| 2 ethyl hexanol | 57 |
| Resin of Example V | 264 |

EXAMPLE VIII

In a suitable reactor were charged 417 parts of PAPI 580[1] under a nitrogen blanket. 261 parts of methyl amyl ketoxime were added in a period of 30 minutes keeping the temperature below 210° F. by external cooling. After the addition was completed the reaction mixture was kept at 210° F. for another hour. At this point an infra-red spectrum of the product showned that all the isocyanate groups were reacted. The batch was then thinned with 226 parts of methyl amyl ketone. The final product had a $Z_{6}+$ viscosity at 75.0 solids.
[1]Trademark, Upjohn Chemical Co., Kalamazoo, Mich.

EXAMPLES IX-XII

Blocked isocyanate crosslinking agents useful in compositions of the invention were prepared in the manner generally described in Example VIII from the components shown in Table II below.

TABLE II

|  | Example | | | |
|---|---|---|---|---|
|  | IX | X | XI | XII |
| Dezmodur L-2291A[1] | 360 | 360 |  |  |
| PAPI - 27[2] |  |  | 399 |  |
| Dezmodur IL[3] |  |  |  | 525 |
| Methyl amyl ketoxime | 174 |  | 261 | 87 |
| Benzotriazole |  | 238 |  |  |
| Methyl amyl ketone | 133 | 150 | 220 | 461 |
| % Non-Volatiles | 80.0 | 80.1 | 75.1 | 57 |
| Viscosity | $Z_{1\frac{1}{2}}$ | $Z_{7}$ | $Z_{2}$ | Z |

[1]Trademark, Mobay Chemical Corporation (Pittsburgh, Pennsylvania)
[2]Trademark, The Upjohn Company (Kalamazoo, Michigan)
[3]Trademark, Mobay Chemical Corporation (Pittsburgh, Pennsylvania)

EXAMPLE XIII

Into a suitable reactor were charged 400 parts of Hylene T (trademark) E. I. duPont de Nemours & Co., (2,4 toluene diisocyanate) under a nitrogen blanket. 200 parts of methyl ethyl ketoxime were added in a period of 30 minutes keeping the temperature below 110° F. by external cooling. After the addition was completed the reaction mixture was kept at 110° F. for another hour. At this point it was measured that the NCO conversion was 50%. 787 parts of Castor oil (D.I. Castor Oil, product of Spencer Kellog Textron Inc.) and 1 part of dibutyl tin dilaurate were added in a period of 30 minutes keeping the temperature below 210° F. After one hour from the end of the addition an infra-red spectrum of the product showed that all the isocyanate groups were reacted. The batch was then thinned with 346 parts of methyl amyl ketone. The final product had a $Z_{4}+$ viscosity at 77.1% solids.

EXAMPLE XIV 1515 parts Hylene T (trademark) E. I. duPont de Nemours & Co. (2,4 tolylene diisocyanate) were charged under a nitrogen blanked into a reactor. 757.5 parts of methyl amyl ketoxime were added in a period of one hour keeping the temperature below 110° F. by external cooling. After the addition was completed the batch was kept for one hour at 170° F. At this point 1.5 parts of dibutyl tin dilaurate were added to the reaction mixture and then 342 parts of 1,4 butane diol were added in a period of one hour. The temperature of the reaction was kept below 220° F. After one hour from the end of the addition an infra-red spectrum of the product showed that all the isocyanate groups were reacted. The batch was then thinned with 666 parts of methyl ethyl ketone. The final product had an $Z_{4}+$ viscosity at 80% solids.

EXAMPLE XV

In a suitable reactor were charged 1515 parts of 2,4-toluene diisocyanate. 1335 parts of oligoester (reaction product of propylene oxide and azelaic acid) were added in a period of 2 hours under a nitrogen blanket. During the addition the reaction mixture was kept between 180° F. and 200° F. The reaction product was kept at 200° F. for another 2 hours at which point the % NCO conversion reached 50%. 757.5 parts of methyl amyl ketoxime were added in a period of one hour while the temperature was kept below 210° F. At the end of the addition 898 parts of methyl ethyl ketone were added to the reaction mixture and the NCO content was checked by IR. The final product had a $Z_3$ viscosity at 80% solids.

EXAMPLE XVI

A blocked isocyanate crosslinker useful in compositions of the invention was prepared as follows. Three (3) moles of 2,4 tolylene diisocyanate was weighed into a 2-liter round bottom flask equipped with a stirrer, reflux condensor, thermometer and heating mantel and 2-ethylhexanol (3 moles) was added dropwise over 40 minutes. The reaction temperature was held below 50° C. using a cold water bath and throughout the reaction the flask was flushed with dry nitrogen to maintain an inert atmosphere. After 2 hours the conversion, which was determined by measuring the isocyanate concentration by titration with dibutylamine solution was 49.7%. Five (5) grams of potassium octoate (0.55% on solids) was added to the flask. An exothermic reaction took place and 500 grams cellosolve acetate were added to stop the exothermic reaction at 125° C. The temperature dropped and held at 105° C. After two hours the trimer conversion was 98% and the reaction was terminated. The crosslinker was purified by repeated recrystallization using cellosolve acetate and heptane.

EXAMPLE XVII

A blocked isocyanate crosslinker useful in compositions of the invention was prepared as follows. Two (2.0) moles of 2,4 tolylene diisocyanate was weighted into a round bottom flask equipped as in Example XIII and methyl ethyl ketoxime (2.0 moles) was added dropwise over 30 minutes. The temperature was held below 45° C. and the flask flushed with nitrogen. The mixture was heated to 65° C. and 0.8 grams of potassium octoate (0.15% on solids) was dissolved in 50 grams xylene and added dropwise to the reaction mixture. After 30 minutes the temperature rose to 85° C. and an additional 80 grams of xylene were added. After one hour the NCO conversion was 91.3%. 0.3 grams of potassium octoate (0.06%) was dissolved in 100 grams of xylene and added to the reaction mixture. After 45 minutes, 100% conversion to trimer was achieved. The crosslinker was purified by repeated recrystallization using methyl ethyl ketone and heptane.

EXAMPLE XVIII

A blocked isocyanate crosslinker useful in compositions of the invention was prepared as follows. Three (3.0) moles of isophorone diisocyanate was weighed into a round bottom flask equipped as in Example XIII and seven drops of dibutyl tindilaurate catalyst were added. Three moles of 2-ethylhexanol were added dropwise over 45 minutes. The temperature was held below 50° C. while the flask was flushed with nitrogen. After one hour, 2.0 grams of potassium octoate (0.18% on solids) was added and the reaction temperature rose to 80° C. in 30 minutes. An additional 2.4 grams of potassium octoate were added. After one hour at 130° C. an Infrared spectrum showed no NCO peak and the reaction was terminated. The crosslinker was recrystallized from heptane.

EXAMPLE XIX

A blocked isocyanate crosslinker useful in compositions of the invention was prepared as follows. Three (3.0) moles of isophorone diisocyanate was weighed into a round bottom flask equipped as in Example XIII and eight drops of dibutyl tin dilaurate were added. Methyl ethyl ketoxime (3.0 moles) was added dropwise over one hour and the temperature was held below 50° C. while flushing with nitrogen. After 30 minutes the NCO conversion was 49.8%. 1.2 grams of potassium octoate (0.13%) was added and the temperature rose to 80° C. over 30 minutes. 3.0 grams of potassium octoate was added and the reaction temperature began to rise. 100 grams of cellosolve acetate was added in order to control the temperature at 120° C. After eight hours the trimer conversion reached 88.75% and would proceed no further. 50 grams of cellosolve acetate and 28 grams methyl ethyl ketoxime were added and then the reaction was terminated. The crosslinker was purified by repeated recrystallization from toluene and heptane.

EXAMPLES XX-XXVII

Coating compositions according to the invention were prepared, each being adapted for use as a high solids, sprayable, pigmented primer for application over bare, unpolished steel automotive vehicle body panels in an automotive vehicle assembly operation. The coating composition components are shown in Table II, below. Each coating composition was reduced with methyl amyl ketone to about 18-25 sec. #4 Ford Cup, 27° C. (80° F.) to provide a preferred spraying viscosity. It will be noted that use of a drier, as in Examples XX, XXI and XXII is optional, to catalyze reaction of fatty acid double bonds to provide additional crosslinking in the cured resin. In Table III, all amounts are expressed in parts by weight.

TABLE III

| Composition | Example | | | | | | | |
| --- | --- | --- | --- | --- | --- | --- | --- | --- |
|  | XX | XXI | XXII | XXIII | XXIV | XXV | XXVI | XXVII |
| Epoxy Ester Resin of Example I | 270 | 270 | 270 | 270 | 270 | 270 | 270 | 270 |
| Millbase of Example VII | 800 | 800 | 800 | 800 | 800 | 800 | 800 | 800 |
| Crosslinker of Example VIII | 125 |  |  |  |  |  |  |  |
| Crosslinker of Example IX |  | 115 |  |  |  |  |  |  |
| Crosslinker of Example X |  |  | 115 |  |  |  |  |  |
| Crosslinker of Example XI |  |  |  | 125 |  |  |  |  |
| Crosslinker of Example XII |  |  |  |  | 162 |  |  |  |
| Crosslinker of Example XIII |  |  |  |  |  | 120 |  |  |
| Crosslinker of Example XIV |  |  |  |  |  |  | 115 |  |
| Crosslinker of Example XV |  |  |  |  |  |  |  | 115 |
| 6% Manganese Naphthanate | 4 | 4 | 4 |  |  |  |  |  |

TABLE III-continued

| Composition | XX | XXI | XXII | XXIII | XXIV | XXV | XXVI | XXVII |
|---|---|---|---|---|---|---|---|---|
| (drier) | | | | | | | | |
| dibutyl tin dilaruate | 1 | 1 | 1 | 1 | | | | |
| N—methyl pyrolidone | 20 | 20 | 20 | 20 | 20 | 20 | 20 | 20 |

EXAMPLES XXVIII–XXXVI

Additional coating compositions according to the invention, each adapted for use as a high solids, sprayable pigmented primer for application over, for example, bare, unpolished steel automotive vehicle body panels in an automotive vehicle assembly operation, are prepared as shown in Table IV, below. It should be noted that use of a drier, as in the coating compositions illustrated in Table IV, is optional. The epoxy ester resin employed in each coating composition is identified by reference to the Example according to which it was prepared. All amounts are expressed in parts by weight.

TABLE IV

| Composition | XXVIII | XXIX | XXX | XXXI | XXXII | XXXIII | XXXIV | XXXV | XXXVI |
|---|---|---|---|---|---|---|---|---|---|
| Epoxy Ester of Example | II | III | IV | V | VI | I | I | I | I |
| | 270 | 270 | 270 | 270 | 270 | 270 | 270 | 270 | 270 |
| Crosslinker of Example XII | 125 | 125 | 125 | 125 | 125 | | | | |
| Crosslinker of Example XVI* | | | | | | 156 | | | |
| Crosslinker of Example XVII* | | | | | | | 156 | | |
| Crosslinker of Example XVIII* | | | | | | | | 156 | |
| Crosslinker of Example XIX* | | | | | | | | | 156 |
| Millbase of Example VII | 800 | 800 | 800 | 800 | 800 | 800 | 800 | 800 | 800 |
| 6% Manganese Naphthanate (drier) | 4 | 4 | 4 | 4 | 4 | 4 | 4 | | |
| N—methyl pyrolidone | 30 | 30 | 30 | 30 | 30 | 20 | 20 | 20 | 20 |
| dibutyl tin dilaurate | 1 | 1 | 1 | 1 | 1 | 1 | 1 | 1 | 1 |

*predissolved in N—methyl pyrolidone (60% NV).

EXAMPLES XXXVII–XXXXIV

The coating composition of Examples XX–XXVII were spray applied to bare, unpolished Bonderite steel, cured, and tested for corrosion resistance and humidity resistance. The curing schedule and the results of the testing are shown in Table V, below. Corrosion is measured as inches of corrosion from scribe line following 240 hours salt spray. Humidity resistance is qualitatively evaluated following exposure to condensing humidity at 43° C. (110° F.).

TABLE V

| | XXXVII | XXXVIII | XXXIX | XXXX | XXXXI | XXXXII | XXXXIII | XXXXIV |
|---|---|---|---|---|---|---|---|---|
| Properties | \multicolumn{8}{c}{Coating Composition of Example} | | | | | | | |
| | XX | XXI | XXII | XXIII | XXIV | XXV | XXVI | XXVII |
| Curing Schedule | 150° C. 20 min. | 150° C. 20 min. | 150° C. 20 min. | 150° C. 20 min. | 150° C. 20 min. | 150° C. 20 min. | 150° C. 20 min. | 150° C. 20 min. |
| Corrosion Resistance | 2/8" | 2/8" | ⅛" | 2/8" | 2/8" | ⅛" | ⅛" | ⅛" |
| Humidity Resistance | Excel. | Excel. | Excel. | Good | Excel. | Good | Good | Good |

In view of this disclosure, many modifications of this invention will be apparent to those skilled in the art. It is intended that all such apparent modifications fall within the true scope of this invention and be included within the terms of the appended claims.

Industrial Applicability

It will be apparent from the foregoing that this invention has industrial applicability as a coating composition, especially as a high solids primer coat composition for automotive vehicles, household appliances and the like, and other applications where the coating composition desirably has excellent humidity and solvent resistance to protect a substrate, for example a metal substrate, against corrosion, wear and the like.

What is claimed is:

1. A novel, organic solvent based, thermosetting coating composition comprising:

A. epoxy ester resin of number average molecular weight ($M_n$) about 900 to about 5000, being the reaction product of diepoxide with (i) diphenol in chain extension reaction, (ii) dicarboxylic acid in chain extension reaction, and (iii) monobasic fatty acid in chain terminating esterification reaction, which chain extension and esterification reactions occur substantially simultaneously at a reaction temperature reaching at least about 135° C., wherein the epoxy functionality, phenol functionality, dicarboxylic acid carboxyl functionality and monobasic fatty acid carboxyl functionality are employed in relative proportions ofabout 1:0.2–0.6:0.1–0.4:0.4–0.9 equivalents, respectively; and B. blocked polyisocyanate crosslinking agent comprising at least one isocyanate group which has been blocked by reaction with an active hydrogen bearing blocking agent, said blocked polyisocyanate crosslinking agent being included in an amount such that upon deblocking of the blocked isocyanato group(s) thereof at the cure temperature of the composition said crosslinking agent will provide between about 0.5 and about 1.6 reactive isocyanato groups per reactive group on said epoxy ester resin.

2. The solvent based, thermosetting coating composition of claim 1, wherein said blocked polyisocyanate crosslinking agent is included in an amount such that upon deblocking it will provide between about 0.8 and about 1.3 isocyanato groups per reactive group on said epoxy ester resin.

3. The solvent based, thermosetting coating composition of claim 1, wherein said active hydrogen bearing blocking agent is selected from the group consisting of (i) aliphatic, cycloaliphatic and aromatic alkyl monoalcohols, (ii) hydroxyl amines; (iii) oximes; (iv) lactams; and (v) triazoles.

4. The solvent based, thermosetting coating composition of claim 1, wherein said blocked polyisocyanate is selected from blocked aliphatic, aromatic, cycloalkylene, aliphatic aromatic and nuclear substituted aromatic polyisocyanates.

5. The solvent based, thermosetting coating composition of claim 1, wherein said blocked polyisocyanate crosslinking agent comprises blocked polymethylene polyphenol isocyanate which prior to blocking has the formula

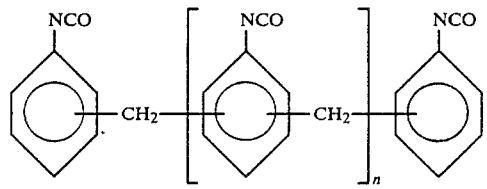

wherein n equals 1 to 3.

6. The solvent based, thermosetting coating composition of claim 1, wherein the polyisocyanate employed in the preparation of said blocked polyisocyanate crosslinking agent comprises polymerized polyisocyanate.

7. The solvent based, thermosetting coating composition of claim 1, wherein the polyisocyanate employed in the preparation of said blocked polyisocyanate crosslinking agent comprises isocyanurate ring containing polyisocyanate prepared by cyclotrimerization of diisocyanate.

8. The solvent based, thermosetting coating composition of claim 7, wherein said isocyanurate ring containing polyisocyanates comprise polyfunctional oligomers.

9. The solvent based, thermosetting coating composition of claim 8, wherein said isocyanurate ring containing polyisocyanates further comprise trifunctional isocyanurate ring containing polyisocyanate.

10. The solvent based, thermosetting coating composition of claim 7, wherein said blocked polyisocyanate crosslinking agent consists essentially of blocked trifunctional isocyanurate represented by the formula:

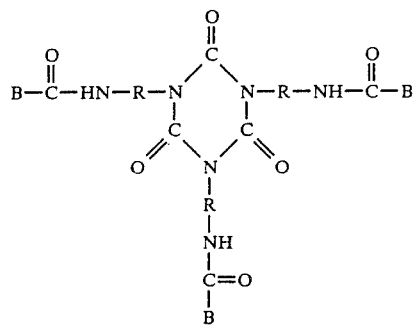

wherein R is selected from the group consisting of aliphatic, cycloaliphatic and aromatic groups and combinations thereof and B is the residue of said active hydrogen bearing blocking agent.

11. The solvent based, thermosetting coating composition of claim 10, wherein said blocked polyisocyanate crosslinking agent is prepared by:

(A) reacting (i) organic diisocyanate represented by the formula

OCN—R—NCO and wherein one of the isocyanato groups thereof is more reactive then the other and (ii) sufficient active hydrogen containing blocking agent represented by the formula BH to react with substantially all of said more reactive isocyanate groups; and (B) cotrimerizing the reaction product of (A) in the presence of a catalyst such that said isocyanate ring containing compound is formed by reaction of 3 moles of said deblocked diisocyanate.

12. The solvent based, thermosetting coating composition of claim 1, wherein the polyisocyanate employed in the preparation of said blocked polyisocyanate crosslinking agent comprises an isocyanate terminated prepolymer prepared by reacting polyols with an excess of polyisocyanate.

13. The solvent based, thermosetting coating composition of claim 12, wherein said polyols are selected from diols and triols.

14. The solvent based, thermosetting coating composition of claim 12, wherein said polyols are selected from polyester and polyether polyols.

15. The solvent based, thermosetting coating composition of claim 12, wherein said polyisocyanate is prepared by reacting an excess of organic diisocyanate with an oligoester diol which (i) has a number average molecular weight ($M_n$) of between about 150 and about 3,000 and (ii) is formed by an esterification reaction between a carboxylic acid and an epoxide, said esterification reaction products being selected from the group consisting of the esterification product of (a) polycarboxylic acid and monoepoxide;
(b) polyepoxide and monocarboxylic acid containing no ethylenic unsaturation and bearing no hydroxy functionality;
(c) hydroxy functional carboxylic acid and monoepoxide;
(d) monocarboxylic acid and hydroxy functional monoepoxide; and
(e) mixtures of (a)-(d).

16. The solvent based, thermosetting coating composition of claim 15, wherein said oligoester is the reaction product of approximately 1 to 1 equivalent quantities of alkylene oxide and polycarboxylic acid.

17. The solvent based, thermosetting coating composition of claim 1, wherein said blocked polyisocyanate crosslinking agent is prepared by
(A) reacting (i) organic diisocyanate represented by the formula

OCN—R—NCO wherein R is selected from the group consisting of aliphatic, cycloaliphatic and aromatic groups and combinations thereof and wherein one of the isocyanato groups thereof is more reactive than the other and (ii) sufficient active hydrogen containing blocking agent represented by the formula BH to reaction with substantially all of said more reactive isocyanto groups; and
(B) reacting the reaction product of (A) with sufficient polyol to react with the remaining isocyanato groups.

18. The solvent based, thermosetting coating composition of claim 17, wherein said polyol is a monomeric diol or triol.

19. The solvent based, thermosetting coating composition of claim 17, wherein said polyol is selected from polyester and polyether diols and triols.

20. The solvent based, thermosetting coating composition of claim 17, wherein said polyol is selected from oligoester diols and triols which (i) have a number average molecular weight ($M_n$) of between about 150 and about 3,000 and (ii) are formed by esterification reaction between a carboxylic acid and an epoxide, said esterification reaction products being selected from the group consisting of the esterification product of:
(a) polycarboxylic acid and monoepoxide;
(b) polyepoxide and monocarboxylic acid containing no ethylenic unsaturation and bearing no hydroxy functionality;
(c) hydroxy functional carboxylic acid and monoepoxide;
(d) monocarboxylic acid and hydroxy functional monoepoxide; and
(e) mixtures of (a)–(d).

21. The solvent based, thermosetting coating composition of claim 20, wherein said oligoester is the reaction product of approximately 1 to 1 equivalent quantities of alkylene oxide and polycarboxylic acid.

22. The solvent based, thermosetting coating composition of claim 1, wherein said number average molecular weight is about 900 to about 2000.

23. The solvent based, thermosetting coating composition of claim 1, wherein said diepoxide has a number average molecular weight of about 100–1000.

24. The solvent based, thermosetting coating composition of claim 1, 4, 5, 7, 11, 12, 15, 17 or 20, wherein said diepoxide resin is selected from the group consisting of bisphenol-A epichlorohydrin epoxy resin, hydantoin epoxy resin, cyclic and acrylic aliphatic diepoxide, and the like and a mixture of any of them.

25. The solvent based, thermosetting coating composition of claim 1, wherein said diepoxide bears two terminal epoxide groups.

26. The solvent based, thermosetting coating composition of claim 1, wherein said diepoxide consists essentially of diglycidyl ether bisphenol-A resin.

27. The solvent based, thermosetting coating composition of claim 1, wherein said diphenol has a number average molecular weight of about 180–500.

28. The solvent based, thermosetting coating composition of claim 1, 4, 5, 7, 11, 12, 15, 17 or 20, wherein said diphenol is of the general formula:

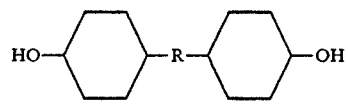

wherein R is a divalent, organic linking moiety substantially unreactive with the epoxy functionality of the diepoxide resin.

29. The solvent based, thermosetting coating composition of claim 28, wherein R is selected from the group consisting of an alkylene or alkylidene moiety of one to about 10 carbons and the like and a mixture thereof.

30. The solvent based, thermosetting coating composition of claim 28, wherein R is

wherein R' and R" are the same or different and each is selected from the group consisting of hydrogen and alkyl of 1 to about 4 carbons, and the like and a mixture of any of them.

31. The solvent based, thermosetting coating composition of claim 28, wherein said diphenol is selected from the group consisting of bisphenol-A, bisphenol-B and the like and a compatible mixture of any of them.

32. The solvent based, thermosetting coating composition of claim 1, wherein said diphenol consists essentially of bisphenol-A.

33. The solvent based, thermosetting coating composition of claim 1, 4, 5, 7, 11, 12, 15, 17 or 20, wherein said dicarboxylic acid has a number average molecular weight of about 145–1000.

34. The solvent based, thermosetting coating composition of claim 1, 4, 5, 7, 11, 12, 15, 17 or 20, wherein said dicarboxylic acid is saturated or unsaturated, cyclic or acyclic aliphatic or aromatic dicarboxylic acid.

35. The solvent based, thermosetting coating composition of claim 1, 4, 5, 7, 11, 12, 15, 17 or 20, wherein said dicarboxylic acid is of the general formula:

HOOC—R'''—COOH wherein R''' is a divalent, linking moiety substantially unreactive with the epoxy functionality of the diepoxide resin.

36. The solvent based, thermosetting coating composition of claim 35, wherein R''' is selected from the group consisting of an alkylene or alkylidene moiety of about 4 to about 42 carbons and the like and a mixture thereof.

37. The solvent based, thermosetting coating composition of claim 1, 4, 5, 7, 11, 12, 15, 17 or 20, wherein said dicarboxylic acid provides two terminal carboxyl groups.

38. The solvent based, thermosetting coating composition of claim 1, wherein said dicarboxylic acid consists essentially of acrylic, aliphatic dimer acid of about 4–42 carbons.

39. The solvent based, thermosetting coating composition of claim 1 or 26, wherein said dicarboxylic acid consists essentially of the dimerization reaction product of C-18 fatty acid.

40. The solvent based, thermosetting coating composition of claim 1, wherein said monobasic fatty acid is selected from the group consisting of monobasic fatty acids of about 8 to about 18 carbons and a mixture of any of them.

41. The solvent based, thermosetting coating composition of claim 1, wherein said monobasic acid consists essentially of substantially saturated aliphatic monobasic fatty acid.

42. The solvent based, thermosetting coating composition of claim 41, wherein said monobasic fatty acid consists essentially of Soya fatty acid.

43. The solvent based, thermosetting coating composition of claim 1, wherein said diepoxide, said diphenol, said dicarboxylic acid and said monobasic fatty acid are employed in relative amounts of about 1:0.5:0.25:0.8 equivalents, respectively.

44. A sprayable, pigmented, high solids primer adapted for use on bare metal substrate, comprising the coating composition of claim 1, 26, 38, or 41, wherein the volatile organic content is less than about 400 g/l and the viscosity no greater than about 35 sec. #4 Ford Cup at 27° C.

45. The sprayable, pigmented, high solids primer of claim 44 wherein the pigment to resin ratio is about 1:1 to about 2:1, respectively.

46. A novel, organic solvent based, thermosetting coating composition comprising:

A. epoxy ester resin of number average molecular weight ($M_n$) about 900 to about 2000, being the reaction product of diepoxide consisting essentially of diglycidyl ether bispheol-A resin with (i) diphenol consisting essentially of bisphenol-A, in chain extension reaction, (ii) dicarboxylic acid consisting essentially of the dimerization reaction product of C-18 fatty acid, in chain extension reaction, (iii) monobasic fatty acid consisting essentially of Soya fatty acid, in chain termination esterification reaction, and (iv) catalyst for said chain extension and esterification reactions, which reactions occur substantially simultaneously at a reaction temperature reaching at least about 135° C., wherein the epoxy functionality, phenol functionality, dicarboxylic acid carboxyl functionality and monobasic fatty acid carboxyl functionality are employed in relative proportions of about 1:0.4–0.6:0.1–0.3:0.6–0.8 equivalents, respectively; and B. blocked polyisocyanate crosslinking agent comprising at least one isocyanato group which has been blocked by reaction with an active hydrogen bearing blocking agent, said blocked polyisocyanate crosslinking agent being included in an amount such that upon deblocking of the blocked isocyanato group(s) thereof at the cure temperature of the composition said crosslinking agent will provide between about 0.5 and about 1.6 reactive isocyanato groups per reactive group on said epoxy ester resin.

47. A sprayable, pigmented, high solids primer adapted for use on bare metal substrate, comprising the coating composition of claim 46, wherein the volatile organic content is less than about 400 g/l and the viscosity no greater than about 35 sec., #4 Ford Cup at 27° C.

* * * * *